Patented Apr. 7, 1942

2,279,205

UNITED STATES PATENT OFFICE 2,279,205

ICE CREAM

Clinton H. Parsons and Everette C. Scott, Chicago, Ill., assignors to Industrial Patents Corporation, Chicago, Ill., a corporation of Delaware No Drawing. Application March 8, 1940, Serial No. 322,999

16 Claims. (Cl. 99—136)

This invention relates to a method of preparing an improved ice cream product, frozen confections, and the like.

One of the objects of this invention is to provide a method of preparing an improved ice cream product, frozen confections, and the like.

Another object of this invention is to provide an improved ice cream product, frozen confections, and the like.

Another object of this invention is to provide an improved emulsifying salt for use in the manufacture of ice cream, frozen confections, and the like.

Other objects and advantages of this invention will become apparent from the following description and claims.

In the usual process of manufacturing ice cream, the mix is made up of liquid and dry ingredients. The liquid ingredients such as cream, milk, unsweetened condensed skim milk, sweetened condensed skim milk or condensed whole milk are mixed in the proper proportions so that the finished product will, after the dry ingredients have been added and are in solution, give the required amount of fat, sugar, serum solids, and stabilizer. The dry ingredients, such as sugar, skim milk powder, whole milk powder, gelatin or gums, are triturated together and then added to the liquid ingredients, care being taken to avoid lumping.

After incorporation of the dry ingredients with the liquid ingredients, the mix is pasteurized, homogenized, aged and frozen. To secure a velvety texture in the finished product, it is desirable in the manufacture of ice cream to incorporate such agents as gelatin, egg yolk or lecithin to cause the formation of finer ice crystals than would be formed in the absence of such agents.

The present invention contemplates the preparation of an ice cream mix or a frozen confection mix by incorporating in the mix a curd prepared from a lacteal fluid, for example, skim milk or whole milk, and a salt prepared by fusing a mixture of anhydrous disodium phosphate, sodium sesquicarbonate and citric acid.

In the preparation of the curd, the lacteal fluid, such as skim milk or whole milk, either raw or pasteurized, is coagulated with a rennet extract, or other enzymes, such as pepsin, or mild acid, in a manner similar to the coagulation of milk in the preparation of cheese. For example, the lacteal fluid, such as milk, is placed in an open vat, heated to about 86 degrees F. and rennet extract or other coagulating substance is added in the proportion of from 3 to 4 ounces of rennet extract to about 1,000 pounds of milk. The milk is then allowed to set until a firm coagulum is formed, which is then cut into small cubes by the use of standard cheese knives in the same manner as is employed in the cutting of the curd in the preparation of Cheddar cheese.

Upon cutting of the coagulum or curd, the whey begins to separate from the cubes and the mass is slowly heated to a temperature of about 94 degrees F. while continuously stirring or agitating moderately the entire mass. After the mass has been maintained at this temperature for about one hour, the whey is drained off. The proportion of curd obtained is obviously dependent upon the starting material. For example, in the case of curd prepared from skim milk, the weight of the curd varies from about 10 per cent to 12 per cent of the original weight of the skim milk. After drawing off the whey, the curd is washed with cold water to chill the curd and prevent its matting together.

The curd is then removed to a steam jacketed kettle and is mixed and blended with sugar, water and the emulsifying salt. The resulting product or emulsion is heated to 160 degrees to 170 degrees F. and agitated until emulsification of the curd is complete. During the emulsification step, a portion of the proteins of the curd becomes partially dissolved and an appreciable swelling of other of the proteins occurs. The emulsified material may be used immediately without cooling, or may be placed in containers, chilled to about 36 degrees F., and aged or held at this temperature for from 3 weeks to 4 weeks before it is employed in the manufacture of ice cream or other frozen confections. We have found that the emulsified product may be aged and held at this temperature practically indefinitely except for surface drying and chance surface mold.

In preparing emulsions including milk, milk solids, or other milk products, numerous types of emulsifying salts are employed, including, for example, sodium citrate and sodium phosphates. We have found, however, that these salts which have been employed in previous methods of preparing emulsions including milk or milk solids are not entirely satisfactory for the purposes of the present invention. Such emulsifying salts as sodium citrate and sodium phosphate produce an undesirable soapy flavor in the finished product. We have discovered a salt, or salt composition which effects the desired emulsification and does not impart the undesirable soapy flavor to the final frozen product.

The emulsifying salt is prepared by heating and fusing a mixture of disodium phosphate, sodium sesquicarbonate and citric acid. The resulting salt composition is about neutral or slightly acid and normally has a pH of from 6.2 to 7.0. Such a proportion of disodium phosphate is employed as to bring the pH of the salt composition to the desired point. Since this salt composition is neutral or slightly acid, the undesirable soapy flavor produced by the use of ordinary emulsifying salts is entirely eliminated and no trace of an objectionable flavor in the product can be detected.

In the preparation of this emulsifying salt composition with anhydrous disodium phosphate, the anhydrous disodium phosphate is moistened with water and heated until all of the phosphate has been dissolved. In the preparation of the salt composition with crystallized disodium phosphate, the phosphate is dissolved in its own water of crystallization by the application of heat. Sodium sesquicarbonate is then added and heating continued to retain the mixture in a fluid condition. Citric acid in an amount chemically equivalent to the sodium sesquicarbonate or in a slight excess is added and thoroughly mixed with the fluid mass and the mixture retained in the fluid mass until the evolution of carbon dioxide ceases. The mass is then cooled and continuously agitated. The product will finally crystallize into a fine grained powder-like salt.

In preparing the emulsion, the proportion of the ingredients and the percentage composition of the finished emulsified milk curd may be varied over a wide range. We prefer, however, to employ from about 60 per cent to 70 per cent milk or skim milk curd, from 13 per cent to 17 per cent sugar, from 10 per cent to 15 per cent water, and from 2 per cent to 3 per cent of the emulsifying salt composition. We have found that in general a product of optimum consistency usually has a percentage composition of about 59 per cent moisture, 22 per cent serum solids, 2.5 per cent emulsifying salt, and 16.5 per cent sugar. Since the emulsifying salt replaces other salts and solids normal to milk which are lost in the whey, the emulsifying salt may be considered as a part of the serum solids or milk solids not fat. The percentage composition of the above example can, therefore, be considered as 59 per cent moisture, 24.5 per cent serum solids, and 16.5 per cent sugar.

In preparing the emulsion, the addition of the salt composition results in a softening and swelling of the proteins of the skim milk curd. The product is thereby given a tremendous water adsorbing property in the ice cream mix. A specific formula for the preparation of the emulsified milk curd contains about 67.5 per cent skim milk curd, 16.25 per cent sugar, 13.5 per cent water and 2.75 per cent emulsifying salt.

Ice cream mixes may be prepared in accordance with our invention with a variety of different formulae. The total serum solids in the mix may be increased above that normally used in the mix due to the low lactose or milk sugar content of the emulsified milk curd, without danger of producing "sandy" ice cream. For example, if the normal serum solids supplied by milk, cream, dried milk, and the like, are reduced by about 1 per cent below that normally used, additional modified serum solids contained in the emulsion equivalent to from 1 per cent to 5 per cent may be added to the mix by the use of the emulsified milk curd.

Examples of satisfactory formulae for the manufacture of a standard ice cream mix and an ice cream mix prepared in accordance with our invention are as follows:

|  | Formula #1 | Formula #2 |
| --- | --- | --- |
|  | Pounds | Pounds |
| 40% cream | 266.30 | 275.10 |
| 3½% milk | 528.40 | 427.10 |
| Skim milk powder | 52.30 | 40.05 |
| Sugar | 150.00 | 129.75 |
| Gelatin | 3.00 | 3.00 |
| Emulsified milk curd |  | 125.00 |
|  | 1,000.00 | 1,000.00 |

The liquid ingredients, such as milk, condensed milk, cream, and, in accordance with the present invention, the emulsified milk curd, are mixed in the desired proportions. The dry ingredients, such as sugar, skim milk powder, gelatin, and the like are triturated together and added to the liquid ingredients. The mix is then pasteurized, homogenized, aged and frozen.

An ice cream product or frozen confection prepared in accordance with our invention is novel in that it possesses a heavy, somewhat gummy or chewy body. The product also possesses a finer and much closer texture than normal ice cream products. Ice cream prepared in accordance with the present invention and packed at the factory with a normal overrun of about 100 per cent has a consistency which is equal to that of hand-packed bulk ice cream.

Because of the use of an acid or neutral salt composition as an emulsifying salt, the flavor of the product may be protected and the characteristic soapy flavor experienced when emulsifying milk proteins with the usual alkaline emulsifying salts is entirely eliminated.

The exact composition of the fused mixture of disodium phosphate, sodium sesquicarbonate and citric acid is not definitely known. However, we have found that it is not possible to prepare a satisfactory salt for the purposes of the present invention by a simple mechanical mixture of the component salts, or by simply mixing various phosphates and citrates, since such a mixture cannot be prepared to form a homogeneous mixture of the salts.

We claim:
1. In a method of preparing frozen confections, the steps which comprise coagulating a lacteal fluid, separating the coagulum from the whey, and emulsifying the coagulum in water by the use of a salt composition prepared by fusing a mixture of disodium phosphate, sodium sesquicarbonate and citric acid.

2. In a method of preparing frozen confections, the steps which comprise coagulating a lacteal fluid with rennet, separating the coagulum from the whey, and emulsifying the coagulum in water by the use of a salt composition prepared by fusing a mixture of disodium phosphate, sodium sesquicarbonate and citric acid.

3. In a method of preparing frozen confections, the steps which comprise coagulating milk, separating the coagulum from the whey, and emulsifying the coagulum in water by the use of a salt composition prepared by fusing a mixture of disodium phosphate, sodium sesquicarbonate and citric acid.

4. In a method of preparing frozen confections, the steps which comprise coagulating skim milk, separating the coagulum from the whey, and emulsifying the coagulum in water by the use of a salt composition prepared by fusing a mixture of disodium phosphate, sodium sesquicarbonate and citric acid.

5. The method of preparing ice cream which comprises incorporating in the ice cream mix an emulsion containing milk curd and an emulsifying salt composition prepared by fusing a mixture of disodium phosphate, sodium sesquicarbonate and citric acid.

6. The method of preparing ice cream which comprises incorporating in the ice cream mix an emulsion containing a skim milk curd and an emulsifying salt composition prepared by fusing a mixture of disodium phosphate, sodium sesquicarbonate and citric acid.

7. The method of preparing ice cream which comprises adding to the ice cream mix a small proportion of an emulsion comprising milk curd, sugar, water, and a salt composition prepared by fusing a mixture of disodium phosphate, sodium sesquicarbonate and citric acid.

8. The method of preparing ice cream which comprises incorporating in the ice cream mix from 1 per cent to 5 per cent modified serum solids contained in an emulsion consisting of from 60 per cent to 70 per cent skim milk curd, 13 per cent to 17 per cent sugar, 10 per cent to 15 per cent water, and 2 per cent to 3 per cent of a salt composition prepared by fusing a mixture of disodium phosphate, sodium sesquicarbonate and citric acid.

9. As an article of manufacture, a frozen confection containing an emulsion of milk curd and an emulsifying salt prepared by fusing a mixture of disodium phosphate, sodium sesquicarbonate and citric acid.

10. As an article of manufacture, an ice cream product containing emulsified milk curd and an emulsifying salt composition prepared by fusing a mixture of disodium phosphate, sodium sesquicarbonate and citric acid.

11. As an article of manufacture, an ice cream product containing from 1 per cent to 5 per cent modified serum solids contained in an emulsion comprising milk curd and an emulsifying salt composition prepared by fusing a mixture of disodium phosphate, sodium sesquicarbonate and citric acid.

12. As an article of manufacture, an ice cream product containing from 1 per cent to 5 per cent modified serum solids contained in an emulsion comprising milk curd, sugar, water and an emulsifying salt composition prepared by fusing a mixture of disodium phosphate, sodium sesquicarbonate and citric acid.

13. As an article of manufacture, an ice cream product containing from 1 per cent to 5 per cent modified serum solids contained in an emulsion comprising from 60 per cent to 70 per cent milk curd, from 13 per cent to 17 per cent sugar, from 10 per cent to 15 per cent water, and from 2 per cent to 3 per cent of an emulsifying salt prepared by fusing a mixture of disodium phosphate, sodium sesquicarbonate and citric acid.

14. The method of preparing an emulsified milk curd which comprises coagulating a lacteal fluid, separating the coagulum from the whey, and emulsifying the coagulum in an aqueous liquid by the use of a salt composition prepared by fusing a mixture of disodium phosphate, sodium sesquicarbonate and citric acid.

15. The method of preparing an emulsified milk curd which comprises coagulating milk, separating the coagulum from the whey, and emulsifying the coagulum in water by the use of a salt composition prepared by fusing a mixture of disodium phosphate, sodium sesquicarbonate and citric acid.

16. The method of preparing an emulsified milk curd which comprises coagulating skim milk, separating the coagulum from the whey, and emulsifying the coagulum in water by the use of a salt composition prepared by fusing a mixture of disodium phosphate, sodium sesquicarbonate and citric acid.

CLINTON H. PARSONS.
EVERETTE C. SCOTT.